(12) United States Patent
Sakamoto et al.

(10) Patent No.: US 6,201,049 B1
(45) Date of Patent: *Mar. 13, 2001

(54) RUBBER COMPOSITION FOR TIRE SIDEWALL

(75) Inventors: Shuichi Sakamoto, Akashi; Masato Kawase, Takarazuka; Noboru Wakabayashi, Kobe; Isamu Tsumori, Amagasaki; Marina Kotani, Akashi; Yoichi Mizuno, Osaka, all of (JP)

(73) Assignee: Sumitomo Rubber Industries, Ltd., Hyogo-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/048,182

(22) Filed: Mar. 26, 1998

(30) Foreign Application Priority Data

Mar. 26, 1997 (JP) ....................................... 9-073692

(51) Int. Cl.$^7$ ............................... C08L 7/00; C08L 9/00; C08L 9/06
(52) U.S. Cl. ......................... 524/186; 524/236; 524/240; 524/251; 524/252; 524/571; 524/575.5
(58) Field of Search ..................................... 524/186, 236, 524/240, 251, 252, 571, 575.5

(56) References Cited

PUBLICATIONS

Ans. 12 of 28 Abstract 1989: 174954—JP63162738 19880706—In House Computer Searched—Abstract pp. 29 and 30, 1988.*
Chemical Patents Index, Basic Abstracts Journal, Week 8833, Oct. 12, 1988, Derwent Publications Ltd., London, GB; AN 230520 , XP002072407 & JP 63 162 738 A (Bridgestone Tire KK), Jul. 6, 1988, abstract.

* cited by examiner

Primary Examiner—Fred Zitomer
(74) Attorney, Agent, or Firm—Birch, Stewart, Kolasch & Birch, LLP

(57) ABSTRACT

A rubber composition which is superior in ozone resistance and is hard to be discolored brown and white which comprises 0.5 to 2.5 parts by weight of a wax containing a component with 45 or more carbon atoms and having an average number of carbon atoms of 28 to 38 and 3.0 to 7.0 parts by weight of antioxidant containing 30 to 100% by weight of N-(1-methylheptyl)-N'-phenyl-p-phenylenediamine per 100 parts by weight of a diene rubber component.

3 Claims, No Drawings

RUBBER COMPOSITION FOR TIRE SIDEWALL

BACKGROUND OF THE INVENTION

The present invention relates to a rubber composition for tire sidewall.

BACKGROUND ART

Hitherto, an antioxidant, a wax and the like have been contained in a rubber composition for tire sidewall to prevent cracking caused by ozone. As the antioxidant, an antioxidant containing N-phenyl-N'-isopropyl-p-phenylenediamine (IPPD) or N-(1,3-dimethylbutyl)-N'-phenyl-phenylenediamine (6PPD) is employed in general and, as the wax, a petroleum wax which contains a component having about 20 to 50 carbon atoms and has an average number of carbon atoms of 30 to 35 is employed in general.

IPPD and 6PPD can provide tire sidewall with superior ozone resistance. However, there is the problem that the surface of the tire sidewall is discolored to a brown color, thereby causing a deterioration of in tire appearance.

Also, the wax is used for improving ozone resistance since the wax blooms to form a film on the surface of tire sidewall. There is a problem, however, that the surface of tire sidewall can be discolored to white when the wax blooms excessively.

For example, in JP-A-63-10646 and JP-A-63-162738, there is disclosed a technology to prevent such deterioration of tire appearance caused by brown discoloration with the use of, as an antioxidant, a compound represented by the general formula:

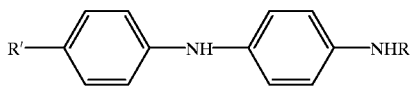

wherein R and R' are independently a hydrogen atom or an alkyl, and the sum of carbon atoms of R and R' is 8 to 19.

There is not disclosed, however, a technology to prevent white discoloration caused by excess bloom of the wax.

Considering the above-mentioned facts, an object of the present invention is to provide a rubber composition which is superior in ozone resistance and is resistant to brown and white coloration.

SUMMARY OF THE INVENTION

The present invention relates to a rubber composition for a tire sidewall obtained by blending 0.5 to 2.5 parts by weight of a wax which contains a component having 45 or more carbon atoms and has an average number of carbon atoms of 28 to 38, and 3.0 to 7.0 parts by weight of an antioxidant containing 30 to 100% by weight of N-(1-methylheptyl)-N'-phenyl-p-phenylenediamine per 100 parts by weight of a rubber component comprising a diene rubber.

In such a case, it is preferable that the rubber component contains 50 to 80% by weight of butadiene and the rubber composition is obtained by further blending therein 0.8 to 1.8 parts by weight of sulfur and an accelerator in an amount satisfying the equation of a weight ratio of sulfur/accelerator=1.5 to 6.0 per 100 parts by weight of the rubber component.

DETAILED DESCRIPTION

The present invention relates to a rubber composition for tire sidewall obtained by blending 0.5 to 2.5 parts by weight of a wax which contains a component having 45 or more carbon atoms and has an average number of carbon atoms of 28 to 38, and 3.0 to 7.0 parts by weight of an antioxidant (antiozonant) containing 30 to 100% by weight of N-(1-methylheptyl)-N'-phenyl-p-phenylenediamine per 100 parts by weight of a rubber component comprising a diene rubber.

The diene rubber constituting the rubber component in the present invention may be a diene rubber employed conventionally in the field of tire. As the diene rubber, there are, for example, natural rubber (NR), butadiene rubber (BR), styrene-butadiene rubber (SBR), isoprene rubber (IR) and the like. The diene rubbers may be used alone or in optional admixture of two or more. Among them, combination use of NR and BR is particularly preferable from the viewpoint of cut growth resistance.

Particularly when BR is used, an amount thereof is preferably 50 to 80% by weight of the rubber component, further preferably 55 to 70% by weight of the rubber component from the viewpoint of compatibility between cut growth resistance and kneading and extruding processability.

In the present invention, a wax which contains 3 to 10% by weight of a component having 45 or more carbon atoms and has an average number of carbon atoms of 28 to 38 is used from the viewpoint of compatibility between cut growth resistance and prevention of white discoloration. Further, a wax which contains 5 to 10% by weight of a component having 45 or more carbon atoms and has an average number of carbon atoms of 34 to 37 is preferably used from the viewpoint of prevention of white discoloration during storage.

As such wax, there is, for example, OZOACE 0355 (component having 45 or more carbon atoms: 9% by weight, average number of carbon atoms: 36, commercially available from Nippoin Seiro Co., Ltd.).

Also, a plurality of different kinds of waxes may optionally be used in optional admixture. In this case, a total amount of components having 45 or more carbon atoms and an average number of carbon atoms with respect to the whole wax admixture are within the above-mentioned ranges.

The antioxidant of the present invention contains 30 to 100% by weight of N-(1-methylheptyl)-N'-phenyl-p-phenylenediamine (8PPD) from the viewpoint of compatibility between ozone crack resistance and prevention of brown discoloration, and preferably contains 30 to 60% by weight of 8PPD from the viewpoint of initial ozone crack resistance.

Also, as the component other than 8PPD which the antioxidant can contain, there are, for example, compounds described as PPD type antioxidants in JP-A-63-10646 and JP-A-63-162738. As 8PPD, for example, OZONONE 35 commercially available from SEIKO CHEMICAL CO., LTD. can be suitably used in the present invention.

A plurality of different kinds of antioxidants may be also optionally used, in admixture. In this case, the 8PPD content in the entire antioxidant admixture may be within the above-mentioned range.

The rubber composition for tire sidewall of the present invention is obtaind by blending together the above-mentioned rubber component, wax and the antioxidant. As the mixing ratio thereof, 0.5 to 2.5 parts by weight of the wax and 3.0 to 7.0 parts by weight of the antioxidant are blended with 100 parts by weight of the rubber component from the viewpoint of compatibility between ozone crack resistance and the prevention of white and brown discoloration. Preferably, 0.5 to 1.5 parts by weight of the wax and 3.0 to 6.0 parts by weight of the antioxidant are blended together from the viewpoint that white discoloration during storage is inhibited and brown discoloration during usage is prevented.

In the present invention, further to the above-mentioned components, sulfur and an accelerator are preferably blended therewith. Particularly when the rubber component contains 50 to 80% by weight of butadiene, sulfur is preferably blended in an amount of 0.8 to 1.8 parts by weight and the accelerator is preferably blended in an amount satisfying the equation of a weight ratio of sulfur/accelerator=1.5 to 6.0 per 100 parts by weight of the rubber component from the viewpoint of ozone crack resistance. In the case where the amount of sulfur is less than 0.8 parts by weight and a ratio of sulfur to the accelerator is less than 1.5, it is not preferable because the amount of the polysulfide bond which relaxes distortion of the tire caused by external force becomes lower, and it is disadvantageous for ozone resistance. On the other hand, when the amount of sulfur is higher than 1.8 parts by weight and the ratio of sulfur to the accelerator is higher than 6.0, it is not preferable because the crosslinking density becomes too high and the blooming rates of the antioxidant and the wax become extremely lower.

Further preferably, sulfur is blended in an amount of 0.8 to 1.3 parts by weight and the accelerator is blended in an amount satisfying the equation of a weight ratio of sulfur/accelerator=1.5 to 4.0 per 100 parts by weight of the rubber component from the viewpoint of stabilizing the ozone crack resistance during the use of the tire. In this case, if an amount of sulfur is not higher than 1.3 parts by weight and the ratio of sulfur to the accelerator is not higher than 4.0, changes in the physical properties of the tire after its use, which is caused by an excess amount of the polysulfide bond, can be prevented.

The accelerator may be an accelerator which is usually used in the field of tires. As the accelerator, there are, for example, N-tert-butyl-2-benzothiazolyl-sulfenamide (TBBS), N-cyclohexyl-2-benzothiazyl-sulfenamide (CBS), mercaptobenzothiazole (MBT), diphenylguanidine (DPG). Among them, TBBS and CBS are preferably used from the viewpoint of scorch time and heating time.

In the present invention, further to the above-mentioned components, a component such as carbon black, process oil, stearic acid, petroleum resin, zinc oxide, silica, coupling agents, or vulcanization retarders which are usually used in the field of tires can be blended in the rubber composition of the present invention in an amount within a range where the effect of the present invention is not decreased.

As for the blending method, a conventional manner can be preferably employed to obtain the rubber composition of the present invention.

Further, the rubber composition of the present invention obtained as above can be applied for the sidewall of tires through a conventional manner. Therefore, the present invention relates to a tire having sidewall comprising the above-mentioned rubber composition. Particularly, the tire is suitable for a truck and bus tire from the veiwpoint that it is necessary for the truck and bus tire, which is used under severer condition, to contain a high amount of antioxidant.

The present invention is explained in detail according to following Examples which should not be considered as limiting the present invention.

PREPARATION EXAMPLES 1 TO 17

Rubber component, wax, antioxidant and accelerator in amounts shown in Table 1 and 2 were kneaded with 50 parts by weight of carbon black, 5 parts by weight of oil, 2 parts by weight of petroleum resin, 2 parts by weight of stearic acid and 4 parts by weight of zinc oxide with a Banbury mixer. Then, vulcanizing agent (sulfur) in an amount shown in Tables 1 and 2 was added thereto and kneaded with a roller to obtain the Rubber Compositions 1 to 17 for tire sidewall.

As carbon black, N330 available from Showa Cabot K.K. was used. As oil, X140 available from JAPAN ENERGY CORPORATION was used. As Wax-1, SUNNOC N (average number of carbon atoms: 34, content of a component with 45 or more carbon atoms: 0% by weight) available from OUCHISHINKO CHEMICAL INDUSTRIAL CO., LTD. was used. As Wax-2, OZOACE 0355 (average number of carbon atoms: 36, content of a component with 45 or more carbon atoms: 9% by weight) available from Nippon Seiro Co., Ltd. was used. As Wax-3, Suntight BW (average number of carbon atoms: 54, content of a component with 45 or more carbon atoms: 60% by weight) available from SEIKO CHEMICAL CO., LTD. was used.

And, as Antioxidant-1, Antigene 6C (6PPD) available from Sumitomo Chemical Co., Ltd. was used. As Antioxidant-2, OZONONE 35 (8PPD) available from SEIKO CHEMICAL CO., LTD. was used. As accelerator, NOCCELER NS-F (TBBS) available from OUCHISHINKO CHEMICAL INDUSTRIAL CO., LTD. was used.

Then, the obtained Rubber Compositions 1 to 17 for tire sidewall were evaluated according to the following methods.

Evaluating method (i) Running test:

From each Rubber Composition 1 to 6, rubber sheets 1, 2, 3, 4, 5 and 6 of 3.5 mm in thickness, 200 mm in width and 190 cm in length were obtained and patched on the surface of tire sidewall to form a sidewall divided to six portions, followed by vulcanizing at 145° C. for 40 minutes to make Testing Tire 1 having a size of 285/75 R24.5. Also, in the same manner, Testing Tire 2 was made by using Rubber Compositions 5 and 7 to 11 and, further, Testing Tire 3 was made by using Rubber Compositions 5 and 12 to 16. And, Testing Tire 4 was made by using Rubber Compositions 5 and 17. It is noted that the rubber sheet 5 was patched on all of Testing Tires 1 to 4 as standard for comparison.

Then, each Testing Tire was used for running about one hundred thousand kilometers and, then, crack resistance thereof were evaluated through their appearances according to the following criteria. The results are shown in Tables 1 and 2.

5: No crack was observed.
4: Small cracks were observed slightly (about 1 mm).
3: Several middle size cracks were observed (about 2 to 3 mm).
2: Many large cracks were observed (about 4 mm).
1: Large cracks were combined with each other, growing to larger cracks.

(ii) Outdoor exposure test:

Testing Tires 1 to 4 which were made in the same manner as in the above-mentioned running test were stood outdoors for two months and, then, degrees of brown discoloration thereof were evaluated through their appearances according to the following criteria. The results are shown in Tables 1 and 2.

5: No brown discoloration was observed.
4: Brown discoloration was observed slightly.
3: Brown discoloration was observed within a half portion of the whole surface of each rubber sheet.

2: Significant brown discoloration was observed over a half portion of the whole surface of each rubber sheet.

1: Brown discoloration was observed on the whole surface of each rubber sheet.

(iii) Indoor storing test:

Testing Tires 1 to 4, which were made in the same manner as in the above-mentioned running test, were stood in a room for three months, while being not exposed to light directly and, then, degrees of white discoloration thereof were evaluated through their appearances according to the following criteria The results are shown in Tables 1 and 2.

5: No white discoloration was observed.

4: White discoloration was observed slightly.

3: White discoloration was observed within a half portion of the whole surface of each rubber sheet.

2: Significant white discoloration was observed over a half portion of the whole surface of each rubber sheet.

1: White discoloration was observed on the whole surface of each rubber sheet.

TABLE 1

|  | Preparation Example (Rubber Composition) | | | | | | | |
|---|---|---|---|---|---|---|---|---|
|  | 1 | 2 | 3 | 4 | 5 | 6 | 7 | 8 |
| Component of Rubber Composition | | | | | | | | |
| Rubber component | | | | | | | | |
| NR (parts by weight) | 60 | 60 | 40 | 60 | 60 | 60 | 60 | 60 |
| BR (parts by weight) | 40 | 40 | 60 | 40 | 40 | 40 | 40 | 40 |
| Wax | | | | | | | | |
| Wax-1 (parts by weight) | — | 1.8 | 1.8 | 1.8 | 2.0 | — | 1.8 | 1.5 |
| Wax-2 (parts by weight) | 2.0 | — | — | — | — | 2.0 | — | — |
| Wax-3 (parts by weight) | — | 0.2 | 0.2 | 0.2 | — | — | 0.2 | 0.5 |
| Average number of carbon atoms of Wax | 36 | 36 | 36 | 36 | 34 | 36 | 36 | 39 |
| Content of component with 45 or more carbon atoms in Wax (% by weight) | 9 | 6 | 6 | 6 | 0 | 9 | 6 | 15 |
| Antioxidant | | | | | | | | |
| Antioxidant-1 (parts by weight) | 2.3 | 2.3 | 2.3 | 2.3 | 3.5 | 3.5 | 3.5 | 3.5 |
| Antioxidant-2 (parts by weight) | 1.2 | 1.2 | 1.2 | 1.2 | — | — | — | — |
| 8PPD content in Antioxidant (% by weight) | 40 | 40 | 40 | 40 | 0 | 0 | 0 | 0 |
| Accelerator (parts by weight) | 0.8 | 0.8 | 0.8 | 0.5 | 0.8 | 0.8 | 0.8 | 0.8 |
| Sulfur (parts by weight) | 1.5 | 1.5 | 1.5 | 1.2 | 1.5 | 1.5 | 1.5 | 1.5 |
| Weight ratio of Sulfur to Accelerator | 1.875 | 1.875 | 1.875 | 2.4 | 1.875 | 1.875 | 1.875 | 1.875 |
| Properties of vulcanized Rubber Composition | | | | | | | | |
| Crack resistance | 4 | 4 | 5 | 5 | 5 | 5 | 5 | 3 |
| Brown discoloration | 4 | 4 | 4 | 4 | 1 | 1 | 1 | 2 |
| White discoloration | 3 | 3 | 3 | 3 | 1 | 2 | 2 | 4 |

TABLE 2

| | Preparation Example (Rubber Composition) | | | | | | | | |
|---|---|---|---|---|---|---|---|---|---|
| | 9 | 10 | 11 | 12 | 13 | 14 | 15 | 16 | 17 |
| Component of Rubber Composition | | | | | | | | | |
| Rubber component | | | | | | | | | |
| NR (parts by weight) | 60 | 60 | 60 | 40 | 60 | 60 | 60 | 60 | 60 |
| BR (parts by weight) | 40 | 40 | 60 | 40 | 40 | 40 | 40 | 40 | 40 |
| Wax | | | | | | | | | |
| Wax-1 (parts by weight) | 2.0 | 1.5 | 2.0 | — | 0.36 | 2.7 | 1.8 | 1.8 | 1.8 |
| Wax-2 (parts by weight) | — | — | — | 1.8 | — | — | — | — | — |
| Wax-3 (parts by weight) | — | 0.5 | — | 0.2 | 0.04 | 0.3 | 0.2 | 0.2 | 0.2 |
| Average number of carbon atoms of Wax | 34 | 39 | 34 | 38 | 36 | 36 | 36 | 36 | 36 |
| Content of component with 45 or more carbon atoms in Wax (% by weight) | 0 | 15 | 0 | 15 | 6 | 6 | 6 | 6 | 6 |
| Antioxidant | | | | | | | | | |
| Antioxidant-1 (parts by weight) | 2.3 | 2.3 | 3.5 | 2.3 | 2.3 | 2.3 | 1.6 | 5.3 | — |
| Antioxidant-2 (parts by weight) | 1.2 | 1.2 | — | 1.2 | 1.2 | 1.2 | 0.9 | 2.7 | 3.5 |
| 8PPD content in Antioxidant (% by weight) | 40 | 40 | 0 | 40 | 40 | 40 | 36 | 34 | 100 |
| Accelerator (parts by weight) | 0.8 | 0.8 | 1.0 | 0.8 | 0.8 | 0.8 | 0.8 | 0.8 | 0.8 |
| Sulfur (parts by weight) | 1.5 | 1.5 | 1.2 | 1.5 | 1.5 | 1.5 | 1.5 | 1.5 | 1.5 |
| Weight ratio of Sulfur to Accelerator | 1.875 | 1.875 | 1.2 | 1.875 | 1.875 | 1.875 | 1.875 | 1.875 | 1.875 |
| Properties of vulcanized Rubber Composition | | | | | | | | | |
| Crack resistance | 4 | 2 | 2 | 2 | 2 | 2 | 2 | 5 | 2 |
| Brown discoloration | 3 | 4 | 1 | 3 | 4 | 2 | 4 | 1 | 5 |
| White discoloration | 1 | 4 | 1 | 4 | 4 | 1 | 3 | 2 | 4 |

According to the present invention, a rubber composition for tire sidewall which is superior in ozone resistance and is hard to be discolored to brown and white can be obtained.

What we claim is:

1. A rubber composition for a tire sidewall which comprises
   0.5 to 2.5 parts by weight of a wax which contains a component having 45 or more carbon atoms and has an average number of carbon atoms of 28 to 38, and
   3.0 to 7.0 parts by weight of a mixture of antioxidants consisting essentially of antioxidant N-(1-methylheptyl)-N'-phenyl-p-phenylenediamine and antioxidant N-(1,3-dimethylbutyl)-N'-phenyl-p-phenylenediamine wherein the mixture of antioxidants contains N-(1-methylheptyl)-N'-phenyl-p-phenylenediamine in an amount of 30 to 60% by weight; the amount of said wax and said antioxidant being based on 100 parts by weight of a diene rubber component.

2. The rubber composition for a tire sidewall of claim 1, wherein the rubber component contains 50 to 80% by weight of butadiene and the rubber composition further contains 0.8 to 1.8 parts by weight of sulfur and an accelerator in an amount satisfying the equation of a weight ratio of sulfur/accelerator=1.5 to 6.0 per 100 parts by weight of the rubber component.

3. The rubber composition of claim 1, wherein the diene rubber is selected from the group consisting of natural rubber, butadiene rubber, styrene-butadiene rubber, isoprene rubber and mixtures thereof.

* * * * *